United States Patent
Harris et al.

(10) Patent No.: US 8,317,126 B2
(45) Date of Patent: Nov. 27, 2012

(54) AIRCRAFT HAVING A LIFT/PROPULSION UNIT

(75) Inventors: Paul J. H. Harris, Bristol (GB); Frank A. Hewitt, Bristol (GB); Martin C. Johnson, Bristol (GB); Christopher Wright, Bristol (GB)

(73) Assignee: Rolls-Royce PLC, London (GB)

( * ) Notice: Subject to any disclaimer, the term of this patent is extended or adjusted under 35 U.S.C. 154(b) by 185 days.

(21) Appl. No.: 12/761,155

(22) Filed: Apr. 15, 2010

(65) Prior Publication Data

US 2010/0301158 A1 Dec. 2, 2010

(30) Foreign Application Priority Data

May 29, 2009 (GB) .................................. 0909158.8

(51) Int. Cl.
*B64C 29/00* (2006.01)
(52) U.S. Cl. ..................... 244/12.5; 244/12.4; 244/23 A; 244/23 B
(58) Field of Classification Search ........ 244/12.3–12.5, 244/23 A, 23 B, 23 D, 60, 99.2, 99.3
See application file for complete search history.

(56) References Cited

U.S. PATENT DOCUMENTS

| | | | | |
|---|---|---|---|---|
| 1,667,002 A | * | 4/1928 | Hall | 244/5 |
| 1,800,794 A | * | 4/1931 | Hartman | 244/12.5 |
| 3,120,362 A | * | 2/1964 | Curtis et al. | 244/52 |
| 3,139,244 A | | 6/1964 | Bright | |
| 3,335,977 A | | 8/1967 | Meditz | |
| 3,972,490 A | | 8/1976 | Zimmermann et al. | |
| 4,605,185 A | * | 8/1986 | Reyes | 244/60 |
| 5,209,428 A | * | 5/1993 | Bevilaqua et al. | 244/12.3 |
| 5,275,356 A | * | 1/1994 | Bollinger et al. | 244/12.3 |
| 5,890,441 A | | 4/1999 | Swinson et al. | |
| 5,996,935 A | | 12/1999 | Snell | |
| 6,371,407 B1 | * | 4/2002 | Renshaw | 244/12.5 |
| 7,510,140 B2 | * | 3/2009 | Lawson et al. | 244/12.5 |

FOREIGN PATENT DOCUMENTS

WO WO 91/17083 A1 11/1991

OTHER PUBLICATIONS

Oct. 29, 2009 Search Report issued in corresponding British Patent Application No. 0909159.8.

* cited by examiner

*Primary Examiner* — Philip J Bonzell
(74) *Attorney, Agent, or Firm* — Oliff & Berridge, PLC

(57) ABSTRACT

An aircraft having a lift/propulsion unit which includes a power unit such as a turboshaft engine which drives a fan through a transmission mechanism. The fan discharges to vectoring nozzles which can be independently swivelled to provide lift or propulsion thrust. An output shaft of the transmission mechanism serves as the main shaft of a motor/generator of modular form. The motor/generator can act as a generator to charge an electrical storage device such as a battery, or as a motor to drive the fan, either alone or to supplement the output of engine. Reaction control nozzles are provided at extremities of the aircraft to provide stabilizing thrust. The aircraft is capable of vertical take off and hovering, with the vectoring nozzles swivelled to a lift position, and forward thrust with the vectoring nozzles swivelled to a propulsion position.

17 Claims, 1 Drawing Sheet

AIRCRAFT HAVING A LIFT/PROPULSION UNIT

This invention relates to an aircraft having a lift/propulsion unit and is particularly, although not exclusively, concerned with such an aircraft which is capable of take-off and landing with little or no forward movement. Such aircraft are known as VTOL (vertical take-off and landing), STOL, (short take-off and landing) or STOVL (short take-off and vertical landing) aircraft.

U.S. Pat. No. 5,996,935 discloses an STOVL aircraft comprising a gas turbine engine including a first fan which is spaced forwardly of the rest of the engine and is provided with swivelling nozzles to direct thrust from the first fan vertically or horizontally to provide lift or forward propulsion. The fan is coaxial with the remainder of the engine and consequently the air delivered by it can have a detrimental impact on the operating characteristics of the engine. Also, a significant proportion of the thrust generated by the aircraft power plant disclosed in U.S. Pat. No. 5,996,935 is derived from the exhaust gas flow from the engine. The first fan serves to provide a balancing moment when the power plant is configured to provide lift.

References in this specification to the vertical and horizontal directions indicate directions with respect to the aircraft when in level flight.

Unmanned aerial vehicles (UAVs) are known. UAVs are used, for example, for reconnaissance purposes, and it is desirable for them to be highly manoeuvrable, particularly if they are to be operated at low levels in an urban environment. Such aircraft require an electrical power supply for operating mission-related equipment (such as cameras) as well as operational systems of the aircraft. Typically, an electrical generator is packaged with the engine of the aircraft for this purpose.

According to the present invention there is provided an aircraft having a fuselage provided with a lift/propulsion unit comprising a power unit and a fan which is driveably connected to the power unit by a transmission mechanism, the fan having a rotary axis which extends upwardly in the attitude of the aircraft corresponding to level flight, and being provided with vectoring means for adjusting the direction of thrust generated by the fan, wherein the vectoring means comprises at least one vectoring nozzle which is mounted for swivelling movement with respect to the fan.

The or each vectoring nozzle may be capable of swivelling over a range of movement between a lift position, in which the fan generates thrust in a vertical direction when the aircraft is on the ground, or is in level flight, and a propulsion position in which the fan generates horizontal thrust to propel the aircraft in forwards (or reverse) flight.

The fan outlet may discharge into a delivery chamber, which communicates with the vectoring nozzle, the vectoring nozzle being mounted for swivelling movement on the delivery chamber.

The fan may be situated at or close to the centre of gravity of the aircraft.

A motor/generator may be drivingly connected to the transmission mechanism.

The motor/generator may have a main shaft which comprises a driveshaft of the transmission mechanism so that the main shaft of the motor/generator serves to transmit power from the power unit to the fan. The transmission mechanism may comprise a gearbox, and the motor/generator may be integrated with the gearbox.

The aircraft may have an electrical storage device, such as a battery or a capacitor of high energy density (known as a supercapacitor or ultracapacitor). The storage device may be chargeable by the motor/generator, and may be adapted to supply electrical power to the motor/generator to apply drive directly to the transmission mechanism to operate the fan. With such an embodiment, the fan may be driven by the power unit alone, the motor/generator alone, or by the power unit and the motor/generator operating in tandem.

The motor/generator may be of modular construction. For example, a plurality of modules may be available, each module being capable of independently functioning as a motor and a generator, so that a single module, or an appropriate number of the modules united to form a single unit, may be installed in driving connection with the transmission mechanism to provide power generation and delivery characteristics suited to a mission for which the aircraft is intended. Alternatively, the motor/generator may be easily fitted and removed, so that a motor/generator suitable for the intended mission can be installed.

Reaction control devices may be provided for generating supplementary thrust to stabilise the aircraft under fan-generated lift. The reaction control devices may be disposed at wing tips of the aircraft and/or at the ends of the fuselage. It will be appreciated that the expressions "wing tips" and "ends of the fuselage" are not to be interpreted narrowly to indicate the absolute extremities of the wings and the fuselage, but embrace positioning of the reaction control devices at some distance inwards of those extremities.

The reaction control devices may comprise discharge nozzles provided with control means for controlling delivery of pressurised air to the nozzles. The control means may comprise control valves for regulating the delivery of air from a source of pressurised air. Alternatively, or in addition, the control means may comprise supplementary fans for driving air under pressure to the discharge nozzles. The supplementary fans may be electrically driven by means of electrical power supplied from the motor/generator, or from the electrical storage device.

For a better understanding of the present invention, and to show more clearly how it may be carried into effect, reference will now be made, by way of example, to the accompanying drawings, in which.

Figure 1:
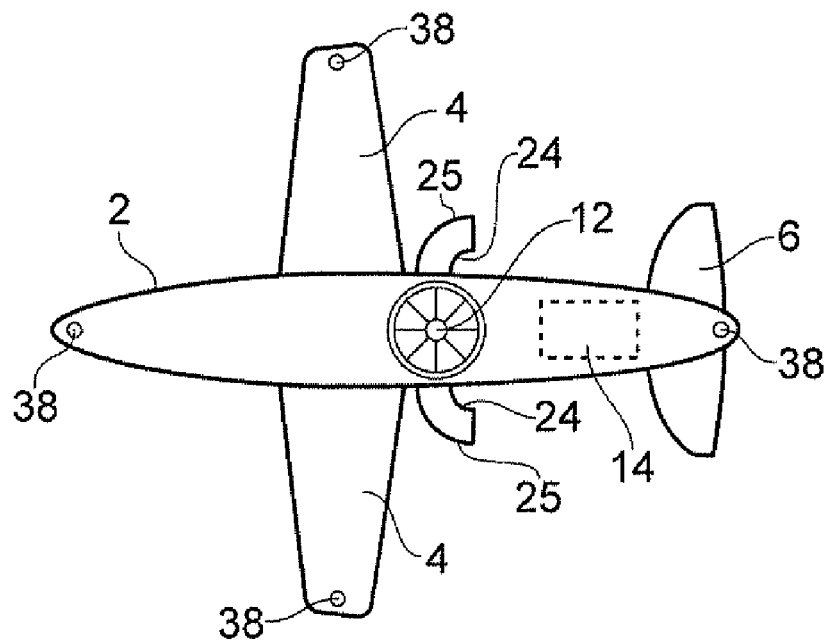
FIG. 1 is a plan view of an aircraft.

The aircraft shown in FIG. 1 is a VTOL aircraft and comprises a fuselage 2 provided with wings 4 and a tail plane 6. In the embodiment shown in FIG. 1, the aircraft is a UAV, although it will be appreciated that the present invention may be applied to manned aircraft. The configuration of the aircraft as shown in FIG. 1 is shown for illustration only; the present invention may be applied to aircraft of widely differing configurations.

The aircraft is provided with a lift/propulsion unit 8 (FIG. 2) which comprises a power unit 14 and a fan 10. As shown in FIG. 1, the fan 10 is situated on the centreline of the fuselage 2, at a lengthwise position along the fuselage 2 which coincides with the centre of gravity 12 of the aircraft. The rotary axis of the fan extends upwardly, and, in the embodiment shown in FIG. 1, is generally vertical.

Figure 2:
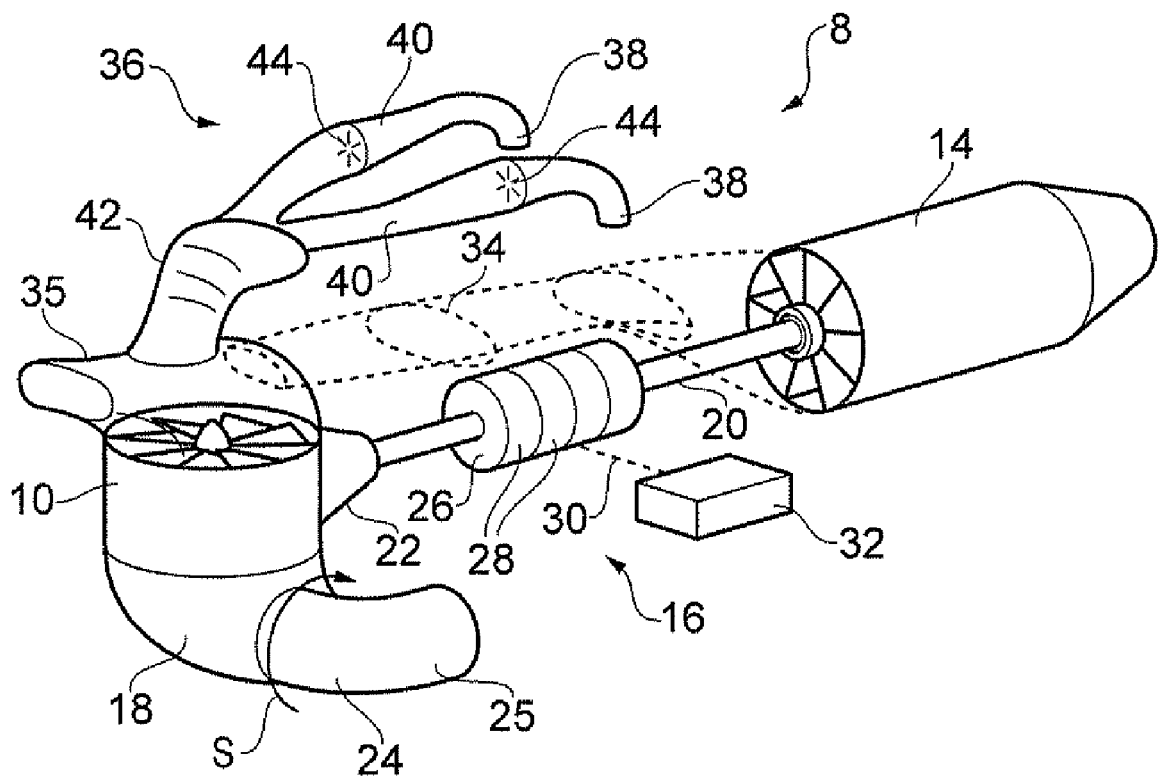
FIG. 2 shows a lift/propulsion unit of the aircraft of FIG. 1.

In the embodiment shown in FIG. 2, the power unit 14 is a turboshaft engine, that is a gas turbine engine which is optimised to provide shaft power rather than jet thrust. The engine 14 is connected by a transmission mechanism 16 to drive the fan 10. The transmission mechanism 16 comprises an output shaft 20 which is driven by the engine 14 and extends in the lengthwise direction of the fuselage 2. The transmission mechanism 16 also comprises a gearbox 22 which incorporates a right angle drive to transmit drive from the output shaft 20 to rotate the fan 10 about its rotary axis.

A delivery chamber 18 in the form of a "trouser-piece" plenum, is provided at the delivery end (ie the lower end) of the fan 10. Vectoring means, in the form of two vectoring nozzles 24, communicate with the interior of the delivery chamber 18 and are mounted for swivelling movement, as indicated by an arrow S, on the delivery chamber 18. Each vectoring nozzle 24 is generally in the form of a duct having a 90° bend which initially projects laterally from the delivery chamber 18 to the sides of the fuselage 2, and can be swivelled to vary the orientation of its discharge end 25.

The output shaft 20 serves as the main shaft of an electrical motor/generator 26. For example, the motor/generator may be a switched reluctance or permanent magnet device of which the rotor is secured to the output shaft 20. As indicated in FIG. 2, the motor/generator is of modular construction, comprising a plurality of modules 28. This enables the characteristics of the motor/generator 26 to be adjusted by adding or removing modules 28 as appropriate. Each module 28 comprises a separate rotor unit and stator unit.

The motor/generator 26 is connected by cabling 30 to an electrical storage device 32 which may, for example, be a battery or a supercapacitor or ultracapacitor.

As indicated in FIG. 1, the engine 14 is situated within the fuselage 2. An intake duct 34 extends from an intake plenum 35, which opens outside the fuselage 2 for capturing intake air, to supply air to the engine 14. The intake plenum 35 opens into the intake end of the fan 10.

The aircraft is provided with a reaction control system 36 (FIG. 2) which comprises nozzles or "puffer jets" 38 situated at or close to the extremities of the aircraft. Thus, there are respective puffer jets 38 at the front and rear ends of the fuselage 2 and at the tip of each wing 4. As indicated schematically in FIG. 2, each puffer jet 38 is connected by a respective supply duct 40 to the intake plenum 35. The supply ducts 40 are provided with control valves 42 and electric fans 44. In alternative embodiments, the air supply to the puffer jets 38 may be derived from the delivery of the fan 10 or from bleed air from the engine 14.

In the condition shown in FIGS. 1 and 2, the vectoring nozzles 24 are positioned with their discharge ends 25 generally horizontal to provide forward, thrust to the aircraft. By swivelling the nozzles 24 as indicated by the arrow S (FIG. 2), the discharge ends 25 can be directed vertically downwards to lie in a plane which extends transversely, for example substantially perpendicular, to the lengthwise direction of the fuselage 2. In this configuration, the common plane of the discharge ends passes substantially through the centre of gravity 12 of the aircraft as a whole. The discharge ends 25 are thus oriented so that the thrust generated by them is exerted upwardly on the fuselage 2, generating lift. Consequently, operation of the fan 10 in this lift configuration can achieve vertical take-off of the aircraft or, if the aircraft is already airborne, can enable it to hover. The puffer jets 38 can be operated to stabilise the aircraft by counteracting any tendency of the aircraft to tilt about its centre of gravity 12. This is achieved by opening the valve or valves 42 and operating the electric fans 44 to modulate the mass flow rate of air through the puffer jets 38.

The vectoring nozzles 24 can be swivelled independently of each other so that one can be in the propulsion position, and one in the lift position, or at any position between these extremes. In the configuration shown in FIG. 2, for example, the left-hand discharge end 25 is shown in the propulsion position, but the right-hand discharge end 25 could be in the lift position. The left-hand discharge end 25 thus provides forward propulsion to the aircraft, while the right-hand discharge end 25 will cause the aircraft to bank rapidly to the left. If the right-hand discharge end 25 remains in the lift position as shown, the aircraft will roll. It will be appreciated that independent control of the vectoring nozzles 24 on opposite sides of the aircraft will enhance the manoeuvrability of the aircraft, enabling it to change direction extremely rapidly.

As shown in FIG. 2, the fan 10 is driven by the engine 14 through the transmission mechanism 16. However, the motor/generator 26 can be operated as a motor, powered from the electrical storage device 32, to replace, or assist, drive from the engine 14. Consequently, at times of high thrust requirement, for example when hovering or taking off vertically, the motor/generator 26 may assist the engine 14 in driving the fans 10. The engine 14 does not, therefore, need to be sized to meet the maximum thrust requirement of the aircraft, since some of this thrust can be achieved by use of the motor/generator 26. In other circumstances, for example if the noise of the engine 14 is to be minimised, the fan 10 may be driven solely by the motor/generator 26 with the engine 14 switched off or idling.

The electric fans 44 of the reaction control system 36, and other electrically driven component of the lift/propulsion unit 8, may be powered from the electrical storage device 32 or directly from the motor/generator 26. The supply ducts 40 receive air from the intake plenum 35 when the valves 42 are open, and the fans 44 are controlled to deliver the required air mass flow rate from the nozzles 38 to achieve or maintain a desired attitude of the aircraft.

Because the motor/generator 26 is of modular construction, modules 28 can be added or removed depending on the power requirements of any particular mission. For example, if a high payload is required with a relatively low power requirement from electrical systems, the number of modules 28 can be reduced, ultimately to one, so providing a significant weight saving. However, additional modules 28 can be added if a mission requires significant electrical power. Similarly, the electrical storage device can be replaced by one of a different capacity or charging rate, or supplemented by one or more additional devices, to suit the requirements of a particular mission.

Although reference has been made above to each vectoring nozzle 24 being capable of swivelling between a lift position in which the discharge end 25 is generally vertical, and a propulsion position in which the discharge end 25 is generally parallel to that of the fuselage 2, the nozzles 24 may be capable of swivelling movement outside this range, for example to provide reverse thrust, or even reverse lift for purposes of manoeuvring.

Although the motor/generator 26 is shown integrated with the output shaft 20 of the engine 14, it is possible for the motor/generator 26 to be integrated with other components of the transmission mechanism 16. For example, a suitably configured motor/generator could be integrated with the gearbox 22. The motor/generator 26 may be configured to supply any required bus voltage of the aircraft.

Although the engine 14 has been referred to as a gas turbine engine in the form of a turboshaft engine, embodiments in accordance with the invention may use different power units, for example a reciprocating piston engine. In such embodiments, lift and propulsion of the aircraft are achieved primarily, or solely, by the fan 10. If a gas turbine engine is used, it need not necessarily be a turboshaft engine, but could be a turbofan engine providing some of the propulsive thrust for the aircraft. If a turbofan engine is used, it may be desirable for a vectoring nozzle to be provided on the engine exhaust, so that propulsive thrust from the engine could be directed appropriately to achieve required movement, or hovering, of the aircraft. For example, a 3 bearing swivel module (3BSM) may be used, as employed on the Joint Strike Fighter.

The lift/propulsion unit 8 as described above can be configured as a modular unit which integrates the engine 14, the fans 10, 10A and 10B and an electrical system comprising at least the motor/generator 26.

The invention claimed is:

1. An aircraft having a fuselage provided with a lift/propulsion unit, the lift/propulsion unit comprising:
   a mechanical transmission mechanism;
   a power unit;
   a fan which is driveably connected to the power unit by the mechanical transmission mechanism, wherein the transmission mechanism comprises of a gearbox,
      the fan having a rotary axis which extends upwardly in the attitude of the aircraft corresponding to level flight, and being provided with vectoring means for adjusting the direction of thrust generated by the fan, wherein the vectoring means has at least one vectoring nozzle which is mounted for swivelling movement with respect to the fan; and
   an electrical motor/generator operable as a motor to drive the fan, and operable as an electrical generator driven by the power unit to provide electrical energy, wherein the electrical motor/generator has
      a main shaft;
      a first end directly connected to the power unit via the main shaft; and
      a second end opposite to the first end directly connected to the gearbox to drive the fan via the main shaft.

2. An aircraft as claimed in claim 1, in which the vectoring nozzle can be swivelled between a lift position in which the nozzle generates thrust in a generally vertical direction, and a propulsion position in which the nozzle generates thrust in a generally horizontal direction parallel to the direction of forward travel of the aircraft.

3. An aircraft as claimed in claim 1, the lift/propulsion unit further comprising a delivery chamber which communicates with the at least one vectoring nozzle, the at least one vectoring nozzle being mounted for swivelling movement on the delivery chamber, wherein the fan comprises a fan outlet which discharges into the delivery chamber.

4. An aircraft as claimed in claim 1, in which the lift/propulsion unit further comprises two vectoring nozzles disposed on opposite sides of the fuselage.

5. An aircraft as claimed in claim 4, in which the vectoring nozzles are mounted for swivelling movement independently of each other.

6. An aircraft as claimed in claim 1, in which the fan is disposed substantially at the centre of gravity of the aircraft.

7. An aircraft as claimed in claim 1, in which the main shaft of the motor/generator further comprises a driveshaft of the mechanical transmission mechanism which transmits power from the power unit to the fan.

8. An aircraft as claimed in claim 1, in which the motor/generator is integrated with the gearbox.

9. An aircraft as claimed in claim 7, in which the lift/propulsion unit further comprises an electrical storage device which is chargeable by the motor/generator and is adapted to supply electrical power to the motor/generator to apply drive to the fan.

10. An aircraft as claimed in claim 7, in which the motor/generator is of modular construction, comprising removable and replaceable modules.

11. An aircraft as claimed in claim 1, in which the lift/propulsion unit further comprises reaction control devices for generating supplementary thrust to stabilise the attitude of the aircraft.

12. An aircraft as claimed in claim 11, in which the reaction control devices are disposed at wing tips of the aircraft and/or at the ends of the fuselage.

13. An aircraft as claimed in claim 12, in which the reaction control devices comprise discharge nozzles provided with control means for controlling delivery of pressurised air to the nozzles.

14. An aircraft as claimed in claim 13, in which the control means comprises control valves.

15. An aircraft as claimed in claim 13, in which the control means comprises supplementary fans.

16. An aircraft as claimed in claim 14, in which the lift/propulsion unit further comprises an electrical storage device which is chargeable by the motor/generator and is adapted to supply electrical power to the motor/generator to apply drive to the fan, and the control valves are electrically driven by means of electrical power supplied by the motor/generator or from the electrical storage device.

17. An aircraft as claimed in claim 15, in which the lift/propulsion unit further comprises an electrical storage device which is chargeable by the motor/generator and is adapted to supply electrical power to the motor/generator to apply drive to the fan, and the supplementary fans are electrically driven by means of electrical power supplied by the motor/generator or from the electrical storage device.

* * * * *